(12) United States Patent  
Okajima

(10) Patent No.: US 11,119,969 B2  
(45) Date of Patent: Sep. 14, 2021

(54) COMMUNICATION SYSTEM AND COMMUNICATION CONTROL METHOD

(71) Applicant: HONDA MOTOR CO., LTD., Tokyo (JP)

(72) Inventor: Kazuhiro Okajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/877,521

(22) Filed: May 19, 2020

(65) Prior Publication Data

US 2020/0379941 A1 Dec. 3, 2020

(30) Foreign Application Priority Data

May 27, 2019 (JP) .............................. JP2019-098697

(51) Int. Cl.
*G06F 13/42* (2006.01)
*G06F 13/36* (2006.01)
(Continued)

(52) U.S. Cl.
CPC .......... *G06F 13/4282* (2013.01); *G06F 13/36* (2013.01); *G06F 15/17* (2013.01);
(Continued)

(58) Field of Classification Search
CPC ....... G06F 13/4282; G06F 13/36; G06F 15/17
See application file for complete search history.

(56) References Cited

U.S. PATENT DOCUMENTS

| 6,385,166 B1* | 5/2002 | Takagi | ................... G08C 25/00 |
| | | | 370/222 |
| 9,201,753 B2* | 12/2015 | Wang | .................. G06F 11/3055 |

(Continued)

FOREIGN PATENT DOCUMENTS

JP 2016-055832 4/2016

*Primary Examiner* — Henry Tsai
*Assistant Examiner* — Christopher A Daley
(74) *Attorney, Agent, or Firm* — Amin, Turocy & Watson, LLP

(57) ABSTRACT

Provided is a communication system including: a first communication bus available for communication of at least a first communication scheme; a second communication bus available for both communication of the first communication scheme and communication of a second communication scheme having a lower processing load than the first communication scheme; a plurality of first communication devices connected to both the first communication bus and the second communication bus; a plurality of second communication devices, connected to the second communication bus, which perform communication through the second communication scheme using the second communication bus; and a processor that detects an abnormality of the first communication bus, wherein each of the plurality of first communication devices performs communication through the first communication scheme using the first communication bus in a case where the abnormality of the first communication bus is not detected by the processor, and performs communication through the first communication scheme using the second communication bus in a case where the abnormality of the first communication bus is detected by the processor.

10 Claims, 8 Drawing Sheets

(51) Int. Cl.
*G06F 15/17* (2006.01)
*H04L 12/40* (2006.01)
(52) U.S. Cl.
CPC ............... *H04L 2012/40215* (2013.01); *H04L 2012/40273* (2013.01)

(56) References Cited

U.S. PATENT DOCUMENTS

| | | | |
|---|---|---|---|
| 10,462,161 B2* | 10/2019 | Carlesimo | H04L 12/40 |
| 2013/0081106 A1* | 3/2013 | Harata | G06F 21/85 |
| | | | 726/2 |
| 2017/0013005 A1* | 1/2017 | Galula | H04L 63/20 |
| 2017/0359241 A1* | 12/2017 | Takada | H04L 12/4625 |
| 2019/0222599 A1* | 7/2019 | Inoue | H04L 63/1425 |
| 2020/0409887 A1* | 12/2020 | Wright | G06F 3/00 |

* cited by examiner 1A (DURING CHARGE OF SECONDARY BATTERY)

COMMUNICATION SYSTEM AND COMMUNICATION CONTROL METHOD

CROSS-REFERENCE TO RELATED APPLICATION

Priority is claimed on Japanese Patent Application No. 2019-098697, filed May 27, 2019, the content of which is incorporated herein by reference.

BACKGROUND

Field of the Invention

The present invention relates to a communication system and a communication control method.

Description of Related Art

Various communication devices are mounted in a communication system which is applied to a vehicle or the like, and each of the communication devices transmits and receives control information or the like through a bus. In connection with this, an invention of a control device of a driving device which is configured to be redundant using a main-system microcomputer and a sub-system microcomputer is disclosed (Japanese Unexamined Patent Application, First Publication No. 2016-55832).

SUMMARY

In recent years, a communication scheme having a high processing load and a communication scheme having a low processing load have been used in combination, and a communication system configured such that one communication device can perform communication through a communication scheme having a high processing load and a communication scheme having a low processing load has been put in practical use. In the related art, a configuration may be excessively complicated when a redundant system is attempted to be thoroughly guaranteed, whereas a problem may occur in continuity of operations when a redundant system is omitted.

The present invention was contrived in view of such circumstances, and one object thereof is to provide a communication system and a communication control method that make it possible to secure to continuity of necessary operations with a simple configuration.

A communication system and a communication control method according to this invention have the following configurations adopted therein.

(1) According to an aspect of this invention, there is provided a communication system including: a first communication bus available for communication of at least a first communication scheme; a second communication bus available for both communication of the first communication scheme and communication of a second communication scheme having a lower processing load than the first communication scheme; a plurality of first communication devices connected to both the first communication bus and the second communication bus; a plurality of second communication devices, connected to the second communication bus, which perform communication through the second communication scheme using the second communication bus; and a processor that detects an abnormality of the first communication bus, wherein each of the plurality of first communication devices performs communication through the first communication scheme using the first communication bus in a case where the abnormality of the first communication bus is not detected by the processor, and performs communication through the first communication scheme using the second communication bus in a case where the abnormality of the first communication bus is detected by the processor.

(2) In the communication system of the aspect of the above (1) which is mounted in a vehicle, the first communication device performs processing relating to traveling control of the vehicle, and the second communication device performs processing relating to control other than the traveling control of the vehicle.

(3) In the aspect of the above (1), in a case where the abnormality of the first communication bus is detected by the processor, at least some of the plurality of first communication devices switch a state of the communication system so as to perform communication through the first communication scheme using the second communication bus.

(4) In the aspect of the above (3), each of the plurality of first communication devices includes the processor, and switches the state of the communication system so as to perform communication through the first communication scheme using the second communication bus.

(5) In the aspect of the above (3), at least some of the plurality of first communication devices are able to output a signal to the second communication bus, and output a predetermined signal to the second communication bus in a case where the abnormality of the first communication bus is detected by the processor, and each of the plurality of first communication devices is switched to a state in which communication is performed through the first communication scheme using the second communication bus in a case where the predetermined signal is received using the second communication bus.

(6) In the aspect of the above (5), the predetermined signal is a signal based on the second communication scheme, and each of the plurality of second communication devices stops communication using the second communication bus in a case where the predetermined signal that flows through the second communication bus is received.

(7) In the aspect of the above (5), the predetermined signal is a signal based on the first communication scheme, and each of the plurality of second communication devices stops communication using the second communication bus when the signal based on the first communication scheme that flows through the second communication bus is detected.

(8) In any aspect of the above (5), at least some of the plurality of first communication devices include the processor, and switch the state of the communication system so as to perform communication through the first communication scheme using the second communication bus, each of the plurality of first communication devices adds one piece of identification information corresponding to itself in a first identification information group to a transmission signal and performs communication using the first communication bus in a case where the abnormality of the first communication bus is not detected by the processor, each of the plurality of second communication devices adds one piece of identification information corresponding to itself in a second identification information group to a transmission signal and performs communication using the second communication bus, and one piece of identification information in the first identification information group is included in the predetermined signal.

(9) In the communication system of any one aspect of the above (1) which is mounted in an electromotive vehicle in which a secondary battery for traveling that is charged from an outside is mounted, the communication system further includes a charge control device that transmits and receives information for performing charge control of the secondary battery, and in a case where the charge control of the secondary battery is performed, the charge control device performs communication through the second communication scheme using both the first communication bus and the second communication bus in a state in which one of the first communication bus and the second communication bus is set as an active system and the other is set as a redundant system.

(10) According to another aspect of the present invention, there is provided a communication control method which is executed in a communication system including a first communication bus available for communication of at least a first communication scheme, a second communication bus available for both communication of the first communication scheme and communication of a second communication scheme having a lower processing load than the first communication scheme, a plurality of first communication devices connected to both the first communication bus and the second communication bus, a plurality of second communication devices, connected to the second communication bus, which perform communication through the second communication scheme using the second communication bus, and a processor that detects an abnormality of the first communication bus, wherein each of the plurality of first communication devices performs communication through the first communication scheme using the first communication bus and performs communication through the second communication scheme using the second communication bus in a case where the abnormality of the first communication bus is not detected by the processor, and performs communication through the first communication scheme using the second communication bus in a case where the abnormality of the first communication bus is detected by the processor.

According to the aspects of the above (1) to (10), it is possible to secure continuity of necessary operations with a simple configuration.

DESCRIPTION OF EMBODIMENTS

Hereinafter, an embodiment of a communication system and a communication control method according to the present invention will be described with reference to the accompanying drawings. A communication system is applied to various systems such as a vehicle system. In the following description, though a communication system is assumed to be mounted in a vehicle, the communication system can be applied to any system insofar as it includes two or more buses and a plurality of communication devices.

[Configuration and Basic Operation]

Figure 1:
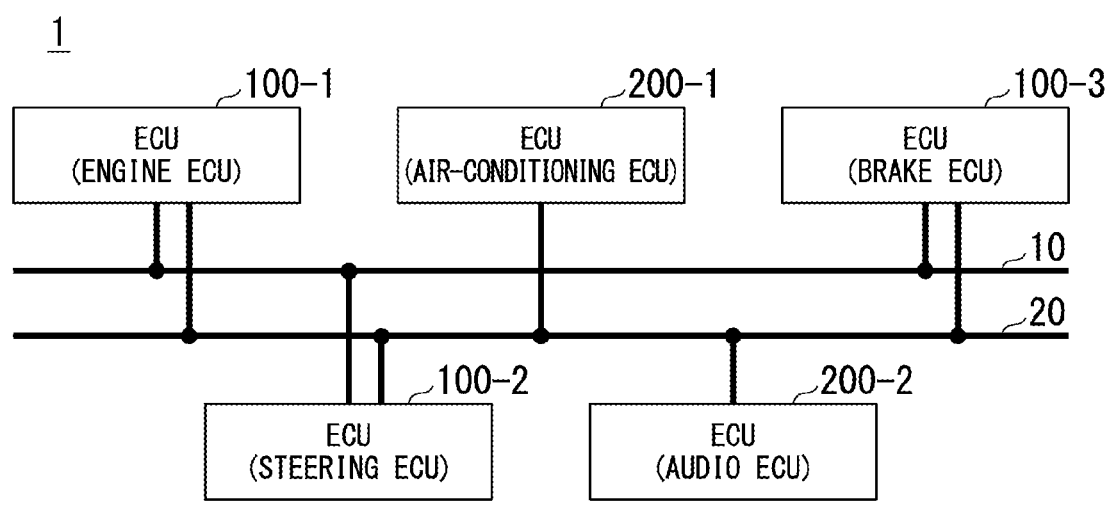
FIG. 1 is a configuration diagram of a communication system according to an embodiment.

FIG. 1 is a configuration diagram of a communication system 1 according to an embodiment. The communication system 1 is mounted in a vehicle. The vehicle is, for example, a four-wheel vehicle, and may be a vehicle of any kind of driving type such as an engine vehicle, a hybrid vehicle, or an electromotive vehicle. The communication system 1 includes, for example, a first communication bus 10, a second communication bus 20, electronic control units (ECUs) 100-1, 100-2, and 100-3 (an example of "a plurality of first communication devices"), and ECUs 200-1 and 200-2 (an example of "a plurality of second communication devices"). In the following description, the ECUs 100-1, 100-2, and 100-3 may be referred to as the ECUs 100 collectively, and the ECUs 200-1 and 200-2 may be referred to as the ECUs 200 collectively. Each of the numbers of ECUs 100 and ECUs 200 may be any number equal to or greater than two.

Each of the first communication bus 10 and the second communication bus 20 is a communication bus capable of communication through both (any one in a case of focusing on a certain timing) of a controller area network with a flexible data rate (CAN-FD) which is an example of a "first communication scheme" and a CAN which is an example of a "second communication scheme." CAN-FD is a communication scheme in which communication can be performed by setting different bit rates in an arbitration phase and a data phase. While data can be transmitted at a high speed by setting a data phase to have a higher bit rate than an arbitration phase, the processing load of an ECU that transmits and receives data becomes higher than a CAN. The first communication scheme and the second communication scheme are not limited to the CAN-FD and the CAN, and any communication scheme may be the first communication scheme, and any communication scheme having a lower processing load than that may be the second communication scheme.

The ECUs 100 perform, for example, processing relating to traveling control of a vehicle. In the example of FIG. 1, an engine ECU that controls an engine, a steering ECU that controls a steering device, and a brake ECU that controls a brake device are exemplified as the ECUs 100-1, 100-2, and 100-3, respectively. The ECUs 100 perform communication through the CAN-FD using the first communication bus 10 at a normal time (to be described later), and perform communication through the CAN-FD using the second communication bus 20 at an abnormal time (to be described later).

The ECUs 200 perform, for example, processing relating to control other than traveling control of a vehicle. In the example of FIG. 1, an air-conditioning ECU that controls an air-conditioning device and an audio ECU that controls an audio device are exemplified as the ECUs 200-1 and 200-2, respectively. The ECUs 200 perform communication through the CAN using the second communication bus 20 at a normal time (to be described later), and stop communication at an abnormal time (to be described later).

Here, frames which are transmitted and received in the CAN-FD and the CAN will be described. Here, each standard format alone will be described, and each extended format will not be described.

Figure 2:
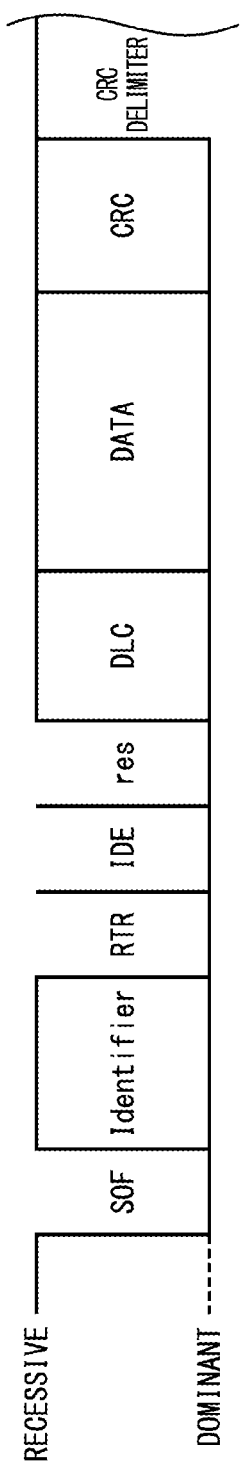
FIG. 2 is a diagram illustrating a configuration of a CAN frame which is transmitted and received through a CAN.

FIG. 2 is a diagram illustrating a configuration of a CAN frame which is transmitted and received through the CAN. The CAN frame includes a start of frame (SOF) indicating the start of a frame, an Identifier which is an identifier of a frame, a remote transmission request (RTR) for identifying a data frame and a remote frame, IDE and res which are fixed to a dominant in a standard format, a DLC which is a data length code, a data main body (DATA), a cyclic redundancy check (CRC) for checking an error of a frame, a CRC delimiter indicating the end of the CRC, and the like. The CRC delimiter and the subsequent regions will not be described.

Figure 3:
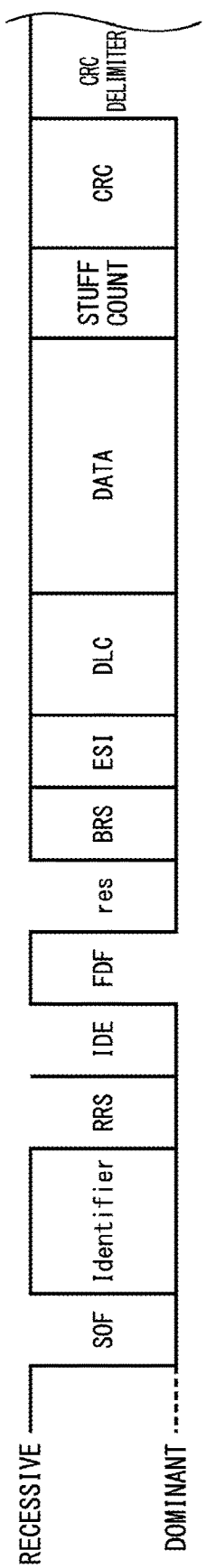
FIG. 3 is a diagram illustrating a configuration of a CAN-FD frame which is transmitted and received through a CAN-FD.

FIG. 3 is a diagram illustrating a configuration of a CAN-FD frame which is transmitted and received through the CAN-FD. The same portions as those of the CAN frame will not be described. The CAN-FD frame includes an SOF and an Identifier, as well as remote request substitution (RRS), IDE, an FD format indicator (FOF) indicating whether the frame is a CAN frame or a CAN-FD frame, res, bit rate switch (BRS) indicating switching of a subsequent clock mode (bit rate) at a high speed, an error state indicator (ESI) indicating the error state of a transmission node, a DLC, a stuff count including a parity bit and a value in which gray coding is performed on a remainder obtained by dividing the number of stuff bits before CRC by 8, a CRC, a CRC delimiter, and the like. The CRC delimiter and the subsequent regions will not be described. In the CAN-FD, regions from the BRS to the CRC delimiter can be sped up more than in the CAN. In the other regions, communication is performed at the same bit rate as the CAN.

Figure 4:
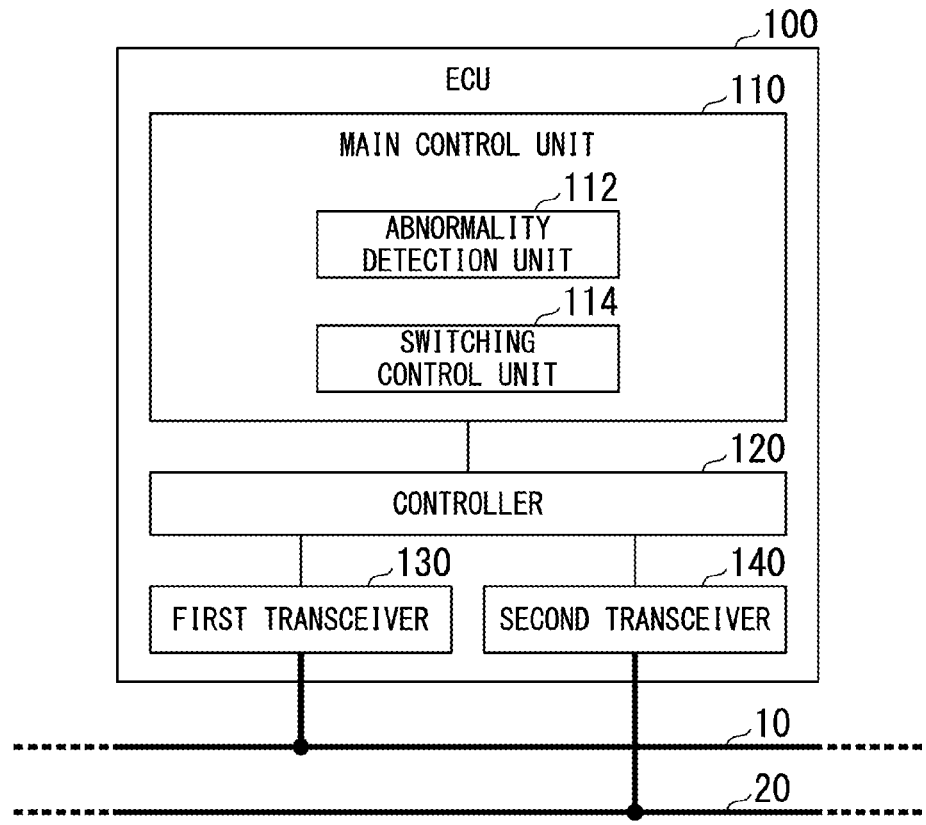
FIG. 4 is a diagram illustrating an example of a configuration of an ECU.

FIG. 4 is a diagram illustrating an example of a configuration of the ECU 100. The ECU 100 includes, for example, a main control unit 110, a controller 120, a first transceiver 130, and a second transceiver 140. The main control unit 110 includes, for example, an abnormality detection unit 112 and a switching control unit 114. Each unit of the main control unit 110 is realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as a hard disk drive (HDD) or a flash memory (a storage device including a non-transitory storage medium) in advance, may be stored in a detachable storage medium such as a DVD or a CD-ROM (a non-transitory storage medium), or may be installed by the storage medium being mounted in a drive device.

The main control unit 110 performs processing for control allocated to the ECU 100. The main control unit 110 performs processing such as engine ignition control, throttle valve opening and closing control, or cranking control in a case where the ECU 100 is an engine ECU, performs processing for performing assist motor driving control on the basis of the output value of a steering torque sensor in a case where the ECU 100 is a steering ECU, and performs processing for brake actuator driving control in a case where the ECU 100 is a brake ECU.

The abnormality detection unit 112 detects an abnormality of the first communication bus 10. The abnormality detection unit 112 detects an abnormality of the first communication bus 10, for example, (1) in a case where a CAN-FD frame is not received from the first communication bus 10 for a constant period of time, (2) in a case where there is no appropriate response in a frame transmitted for the purpose of confirmation, (3) in a case where a frequency at which errors that are difficult to correct are included in the received CAN-FD frame is equal to or greater than a threshold, or the like. When the abnormality detection unit 112 detects the abnormality of the first communication bus 10, the abnormality detection unit notifies the switching control unit 114 to that effect. These events are merely an example, and in the case of an event indicating that it is difficult to perform communication using the first communication bus 10 objectively, the abnormality detection unit 112 may detect the abnormality of the first communication bus 10 with any kind of event.

In a case where the abnormality of the first communication bus 10 has been detected by the abnormality detection unit 112, the switching control unit 114 instructs the controller to output a predetermined signal to the second communication bus 20. Hereinafter, an interval until the abnormality of the first communication bus 10 is detected by the abnormality detection unit 112 and then the abnormality is resolved through repair, self-restoration or the like is referred to as an abnormal time, and an interval except that is referred to as a normal time.

The configuration in which the main control unit 110 includes the abnormality detection unit 112 and the switching control unit 114 is merely an example. As another example, the controller 120 may include the abnormality detection unit and the switching control unit, or a communication device other than the ECU 100 (which is connected to the first communication bus 10 and the second communication bus 20, and is capable of performing communication through at least the CAN-FD) may include the abnormality detection unit and the switching control unit. Some or all of a plurality of ECUs 100 may include the abnormality detection unit 112 and the switching control unit 114.

The controller 120 performs processing such as arbitration processing in the CAN or the CAN-FD, bit stuffing, or a CRC check. The controller 120 controls the first transceiver 130 to output the CAN-FD frame to the first communication bus 10 in accordance with an instruction from the main control unit 110, or controls the second transceiver 140 to output the CAN frame or the CAN-FD frame to the second communication bus 20. The controller 120 extracts a DATA portion of the CAN-FD frame received through the first communication bus 10 to output the extracted DATA portion to the main control unit 110, or extracts a DATA portion of the CAN frame or the CAN-FD frame received through the second communication bus 20 to output the extracted DATA portion to the main control unit 110.

A processor constituting the main control unit 110 and a processor constituting the controller 120 may be the same as each other, or may be different from each other. That is, the main control unit 110 and the controller 120 may be different from each other as software, or may be different from each other as hardware.

The first transceiver 130 is connected to the first communication bus 10. The first communication bus 10 is configured to transfer a signal on the basis of a differential voltage, and the first transceiver 130 includes a voltage generator capable of producing a state in which the differential voltage is near zero (dominant) and a state in which the differential voltage is equal to or higher than a constant voltage (recessive). The first transceiver 130 includes a detection unit that detects a differential voltage, and outputs the detected differential voltage to the controller 120.

The second transceiver 140 is connected to the second communication bus 20. The second communication bus 20 is configured to transfer a signal on the basis of a differential voltage, and the second transceiver 140 includes a voltage generator capable of producing a state in which the differential voltage is near zero (dominant) and a state in which the differential voltage is equal to or higher than a constant voltage (recessive). The second transceiver 140 includes a detection unit that detects a differential voltage, and outputs the detected differential voltage to the controller 120.

Figure 5:
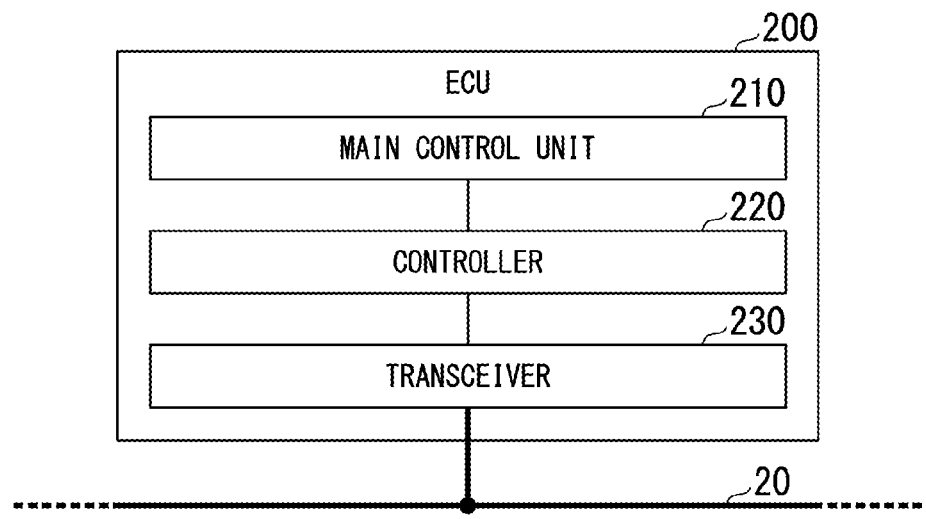
FIG. 5 is a diagram illustrating an example of a configuration of an ECU.

FIG. 5 is a diagram illustrating an example of a configuration of the ECU 200. The ECU 200 includes, for example, a main control unit 210, a controller 220, and a transceiver 230. The main control unit 210 is realized by a hardware processor such as, for example, a CPU executing a program (software). The main control unit 210 may be realized by hardware such as an LSI, an ASIC, an FPGA, or a GPU, or may be realized by software and hardware in cooperation.

The main control unit 210 performs processing for control allocated to the ECU 200. The main control unit 210 performs processing for air flow control or temperature control of an air-conditioning device in a case where the ECU 200 is an air-conditioning ECU, and performs processing for content selection control or volume control in a case where the ECU 200 is an audio ECU.

The controller 220 performs processing such as arbitration processing in the CAN, bit stuffing, or a CRC check. The controller 220 controls the transceiver 230 to output the CAN frame to the second communication bus 20 in accordance with an instruction from the main control unit 210. The controller 220 extracts a DATA portion of the CAN frame received through the second communication bus 20 to output the extracted DATA portion to the main control unit 210.

A processor constituting the main control unit 210 and a processor constituting the controller 220 may be the same as each other, or may be different from each other. That is, the main control unit 210 and the controller 220 may be different from each other as software, or may be different from each other as hardware.

The transceiver 230 is connected to the second communication bus 20. The second communication bus 20 is configured to transfer a signal on the basis of a differential voltage, and the transceiver 230 includes a voltage generator capable of producing a state in which the differential voltage is near zero (dominant) and a state in which the differential voltage is equal to or higher than a constant voltage (recessive). The transceiver 230 includes a detection unit that detects a differential voltage, and outputs the detected differential voltage to the controller 220.

[Communication Mode at Normal Time]

Figure 6:
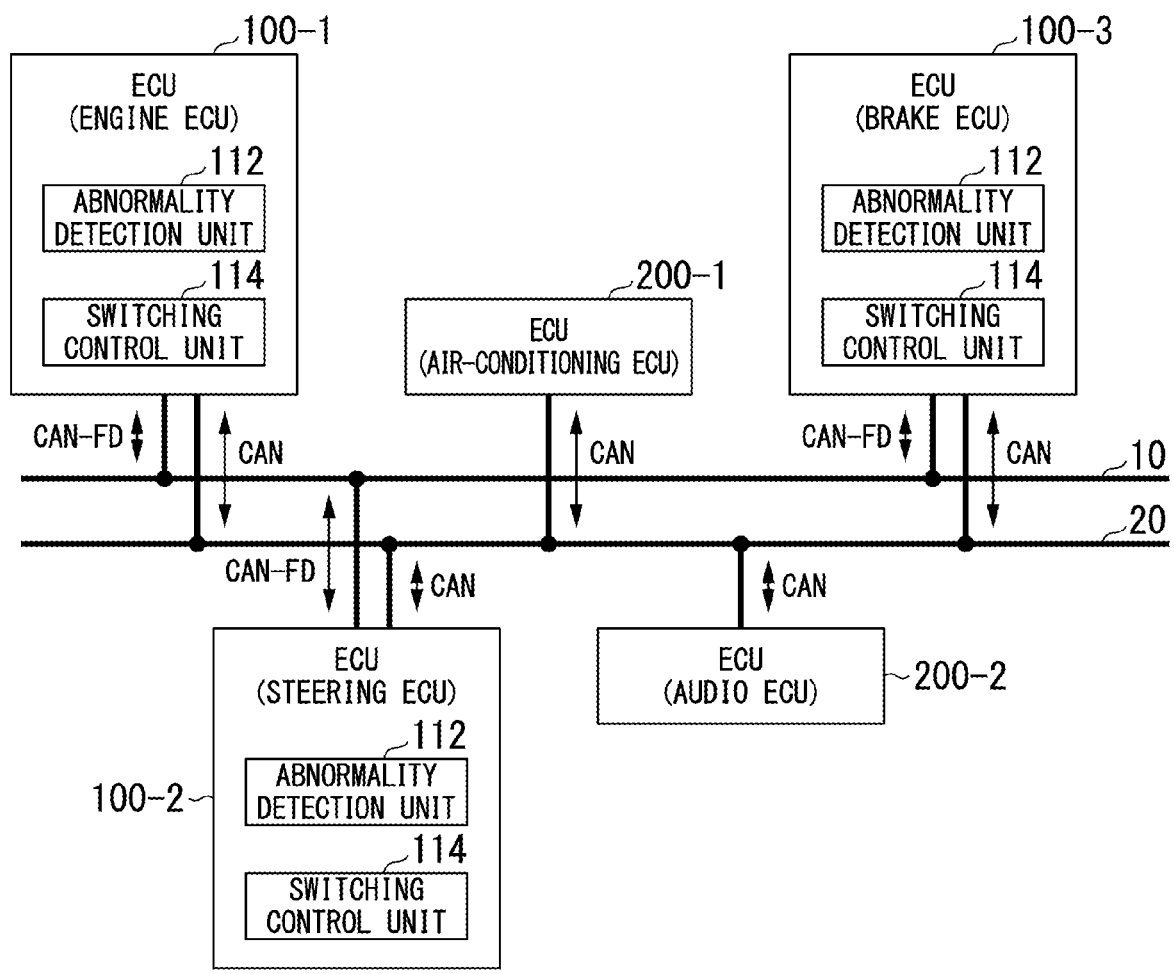
FIG. 6 is a diagram illustrating an example of a communication state of a communication system at a normal time.
Figure 7:
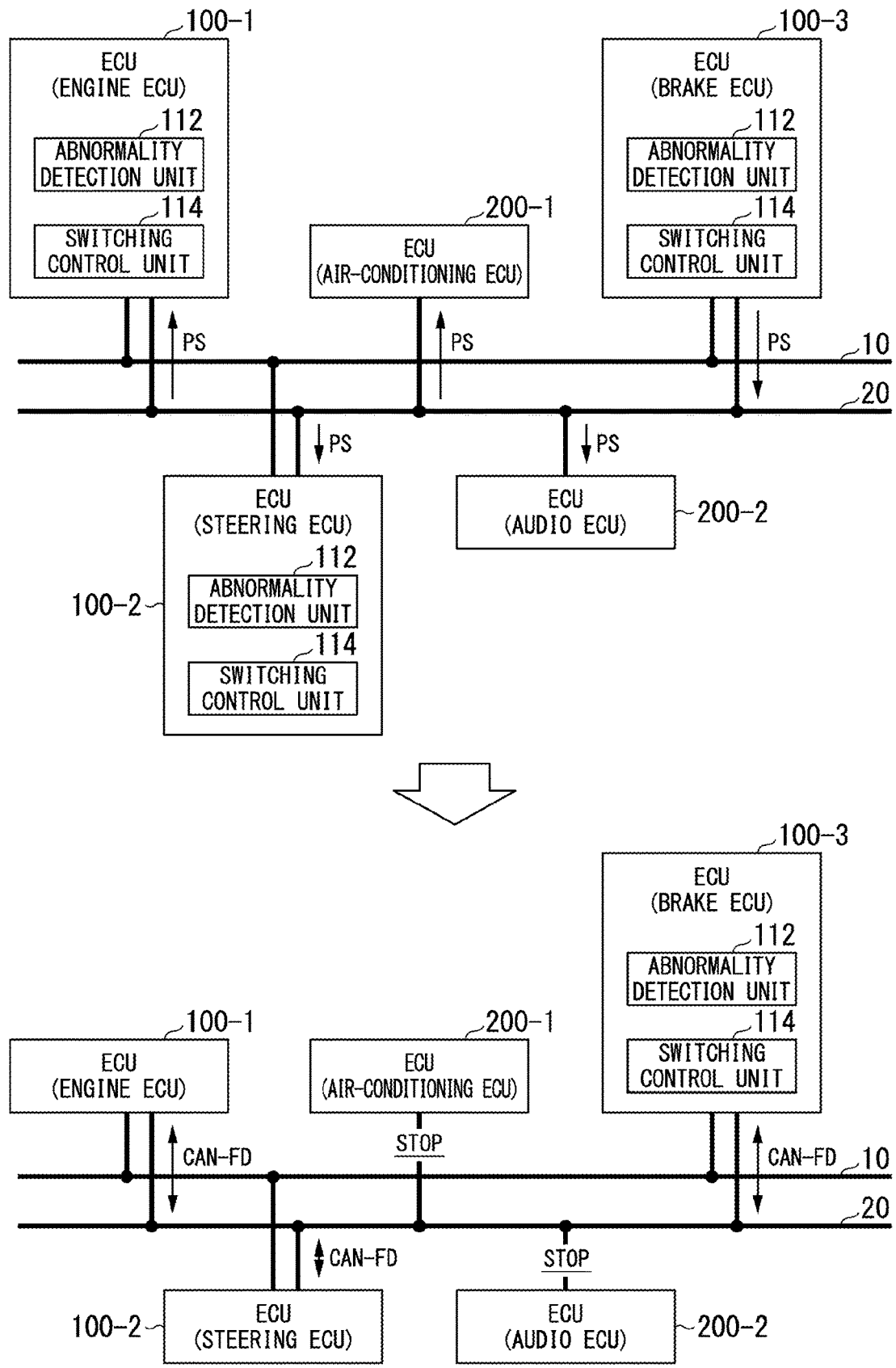
FIG. 7 is a diagram illustrating an example of a communication state of the communication system at an abnormal time.

FIG. 6 is a diagram illustrating an example of a communication state of the communication system 1 at a normal time. As shown in the drawing, at a normal time, the ECUs 100-1, 100-2, and 100-3 transmit and receive the CAN-FD frame using the first communication bus 10, and transmit and receive the CAN frame using the second communication bus 20 (they may also simply refer to the CAN frame without outputting the CAN frame to the second communication bus 20). At a normal time, the ECUs 200-1 and 200-2 transmit and receive the CAN frame using the second communication bus 20. In FIG. 6 and FIG. 7 to be described later, all of the ECUs 100-1, 100-2, and 100-3 are assumed to include the abnormality detection unit 112 and the switching control unit 114.

[Communication Mode at Abnormal Time]

FIG. 7 is a diagram illustrating an example of a communication state of the communication system 1 at an abnormal time. In a case where the abnormality of the first communication bus 10 has been detected by the abnormality detection unit 112, the switching control unit 114 instructs the controller to output a predetermined signal PS to the second communication bus 20. In the drawing, sets of a plurality of abnormality detection units 112 and switching control units 114 are present, but a switching control unit 114 belonging to the same ECU 100 as an abnormality detection unit 112 having initially detected, for example, the abnormality of the first communication bus 10 outputs the predetermined signal PS to the second communication bus 20. The ECUs 100-1 and 100-2 having received the predetermined signal PS switch states so as to perform communication in the CAN-FD through the second communication bus 20. The ECUs 200-1 and 200-2 having received the predetermined signal PS stop communication through the second communication bus 20. In this manner, the switching control unit 114 causes each of the plurality of ECUs 100 to switch states so as to perform communication in the CAN-FD through the second communication bus 20. The switching control unit 114 may cause some of the plurality of ECUs 100 to switch states so as to perform communication in the CAN-FD through the second communication bus 20. In this case, a particular change in state does not occur in ECUs 100 that do not switch states even when the predetermined signal PS is received.

EXAMPLE 1 OF PREDETERMINED SIGNAL

The predetermined signal PS is, for example, a CAN frame based on the CAN. This makes it possible for both the ECUs 100 and the ECUs 200 to analyze the content of the predetermined signal PS.

The Identifier of the predetermined signal PS is set to an Identifier which is used when one of the ECUs 100 performs communication through the first communication bus 10. For example, an Identifier which is used when each ECU 100 performs communication through the first communication bus 10 and an Identifier which is used when each ECU 200 performs communication through the first communication bus 10 are set not to be in common to each other. The Identifier which is used when each ECU 100 performs communication through the first communication bus 10 is set as follows, and the Identifier of the predetermined signal PS is unified into the 001 that is the Identifier of the ECU 100-1 no matter which an ECU 100 that is a transmission source is.

Identifier of the ECU 100-1: 001
Identifier of the ECU 100-2: 002
Identifier of the ECU 100-3: 003

As described above, even though duplicate predetermined signals PS are output to the second communication bus 20, it is possible to prevent a message BOX on the reception side from being occupied. In communication based on the CAN or the CAN-FD, this is because frames to which the same Identifier is given are stored in the same buffer. Since such a structure has a limitation to the number of signals that can be received by a communication principal, the structure is constructed for the purpose of storing only restricted frames required for the communication principal in a buffer without acquiring all the frames flowing through a bus in the buffer.

EXAMPLE 2 OF PREDETERMINED SIGNAL

The predetermined signal PS may be a CAN-FD frame based on the CAN-FD. In this case, since the ECU 200 is the same as the CAN frame, for example, up to the portion of the Identifier of the predetermined signal PS, the predetermined signal PS is determined to have been received in a case where it is detected that the Identifier corresponds to which of the ECUs 100. In a case where it is detected that the formats of portions subsequent to the RRS are different from formats analyzed by itself (that is, in a case where it is detected that the CAN-FD frame rather than the CAN frame used by itself flows through the second communication bus 20), the predetermined signal PS may be determined to have been received.

CONFIGURATION EXAMPLE OF CONTROLLER

As described above, the controller 120 of the ECU 100 can perform communication by switching between the CAN-FD and the CAN in the same communication bus. Hereinafter, a configuration therefor will be exemplified. In the following description, a relationship with the second transceiver 140 alone will be described.

Figure 8:
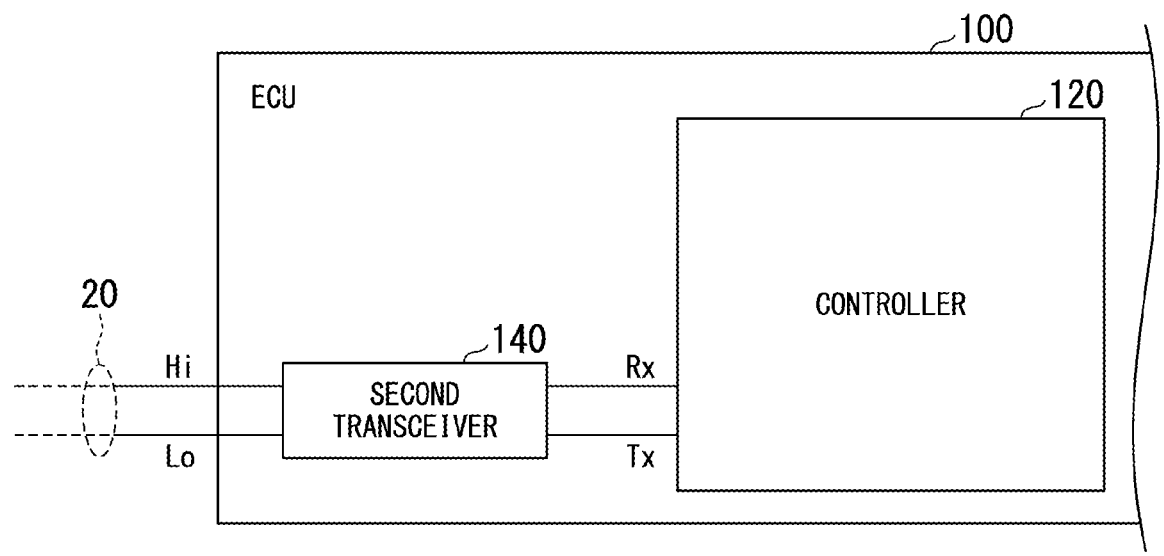
FIG. 8 is a diagram illustrating a first configuration example of a controller and a second transceiver.

FIG. 8 is a diagram illustrating a first configuration example of the controller 120 and the second transceiver 140. In the example of this drawing, the controller 120 can switch between the CAN-FD and the CAN at any timing in accordance with an instruction based on software from the main control unit 110. In this case, the controller 120 and the second transceiver 140 may just be connected to each other through a differential signal line.

Figure 9:
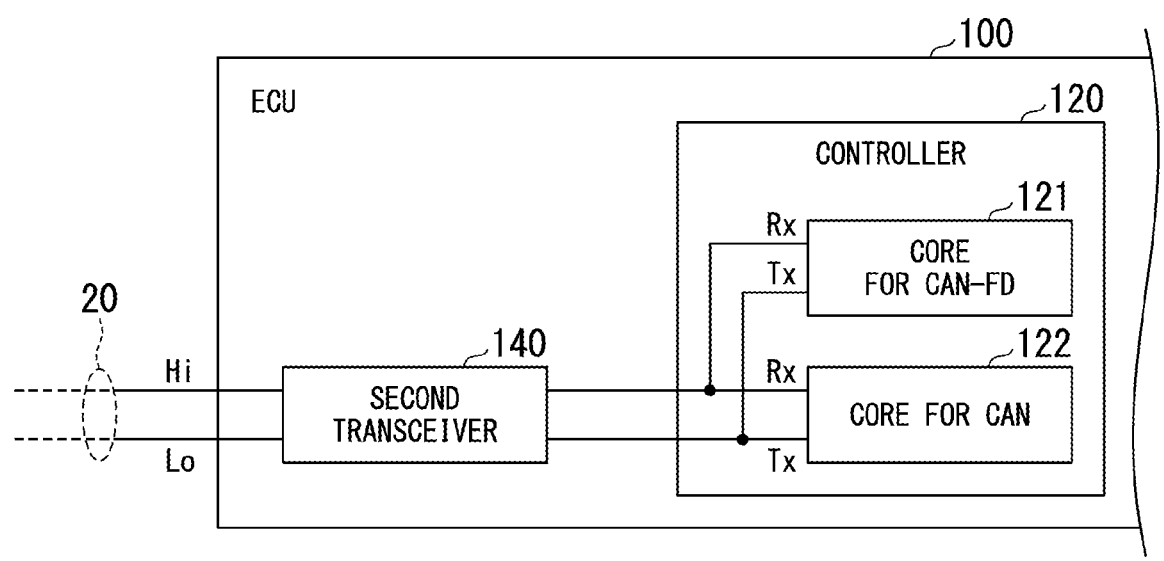
FIG. 9 is a diagram illustrating a second configuration example of the controller and the second transceiver.

FIG. 9 is a diagram illustrating a second configuration example of the controller 120 and the second transceiver 140. In the example of this drawing, the controller 120 includes a core for a CAN-FD 121 and a core for a CAN 122. In each of the core for a CAN-FD 121 and the core for a CAN 122, a setting cannot be changed during its startup, but its operation can be changed on the basis of information which is set in advance. In this case, the second transceiver 140 and each of the core for a CAN-FD 121 and the core for a CAN 122 are connected to each other through a differential signal line.

Figure 10:
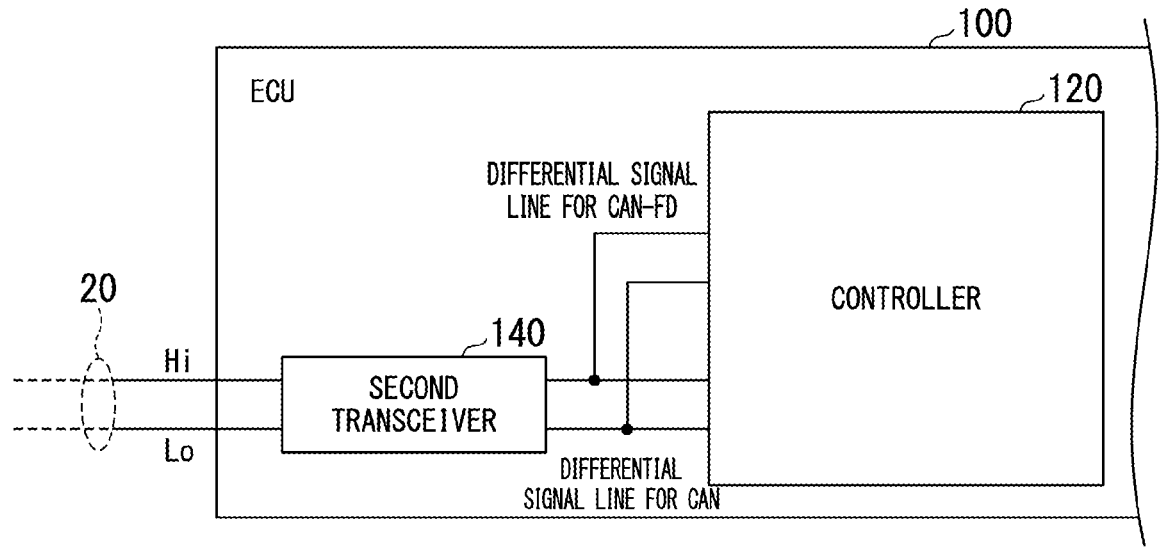
FIG. 10 is a diagram illustrating a third configuration example of the controller and the second transceiver.

FIG. 10 is a diagram illustrating a third configuration example of the controller 120 and the second transceiver 140. In this drawing, a setting can only be performed for each CAN bus that has a fixed value in all the cores. In this case, the controller 120 includes two or more input and output ports of differential communication lines, which are each used for a CAN-FD and for a CAN. In this case, the reception side can be opened at all times. Therefore, whenever the CAN-FD frame arrives instead of the CAN frame, it can be received.

According to the embodiment described above, there is provided the communication system 1 including the first communication bus 10 available for communication of at least the first communication scheme (CAN-FD), the second communication bus 20 available for both communication of the first communication scheme and communication of the second communication scheme (CAN) having a lower processing load than the first communication scheme, a plurality of first communication devices (ECUs 100) connected to both the first communication bus 10 and the second communication bus 20, a plurality of second communication devices (ECUs 200), connected to the second communication bus 20, which perform communication through the second communication scheme using the second communication bus 20, and the abnormality detection unit 112 that detects the abnormality of the first communication bus, wherein each of the plurality of first communication devices performs communication through the first communication scheme using the first communication bus 10 in a case where the abnormality of the first communication bus 10 is not detected by the abnormality detection unit 112, and performs communication through the first communication scheme using the second communication bus 20 in a case where the abnormality of the first communication bus 10 is detected by the abnormality detection unit 112. Thereby it is possible to secure continuity of necessary operations with a simple configuration.

In the above embodiment, though the CAN-FD is exemplified as an example of the first communication scheme and the CAN is exemplified as an example of the second communication scheme, but without being limited thereto, any two communication schemes in which one of them has a relatively high processing load and the other has a relatively low processing load may be adopted as the first communication scheme and the second communication scheme, respectively.

MODIFICATION EXAMPLE

Figure 11:
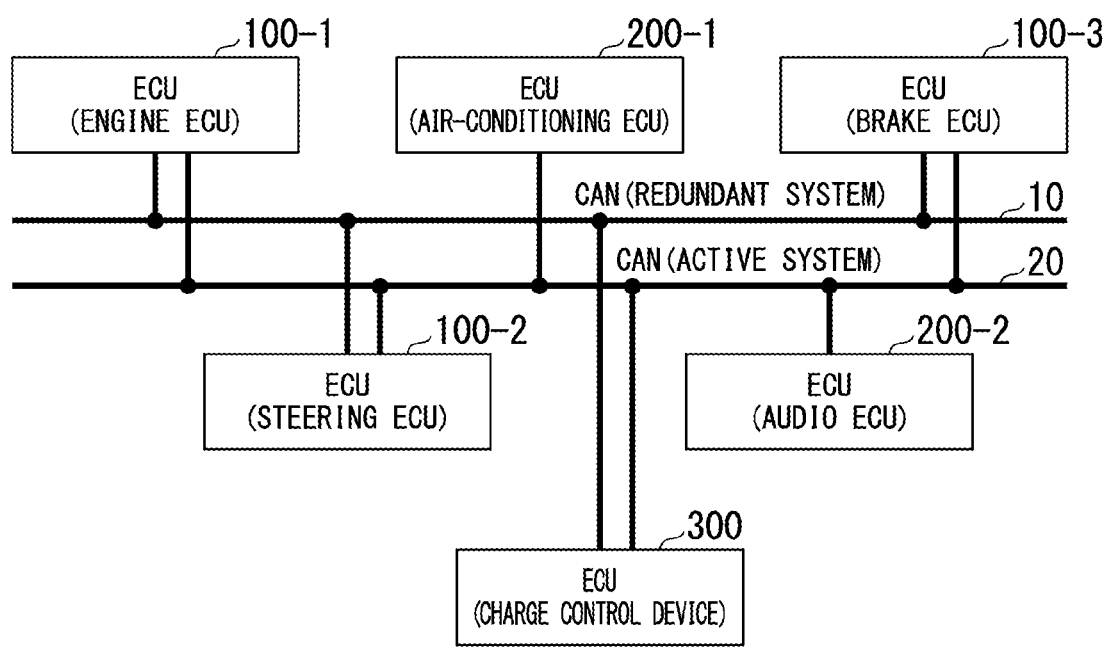
FIG. 11 is a configuration diagram of a communication system according to a modification example.

A communication system may further have the following functions. FIG. 11 is a configuration diagram of a communication system 1A according to a modification example. The communication system 1A is mounted in an electromotive vehicle in which a secondary battery that stores power for traveling which is charged from the outside is mounted. In the communication system 1A, an ECU 300 is connected to both the first communication bus 10 and the second communication bus 20. The ECU 300 functions as a charge control device that controls charge of the secondary battery from the outside. Since the charge of the secondary battery from the outside is performed in a state in which an electromotive vehicle stops and most of a vehicle system stops, the necessity to use the first communication bus 10 for the CAN-FD is extremely reduced. For this reason, in the communication system 1A, in a case where the charge of the secondary battery from the outside is performed (the start of charge reported by the ECU 300), communication based on the CAN-FD is stopped, and both the first communication bus 10 and the second communication bus 20 are used in communication based on the CAN. One of the first communication bus 10 and the second communication bus 20 is set as an active system, and the other is set as a redundant system, to perform communication in a state in which the degree of redundancy is secured. With such a configuration, the communication system 1A can perform redundant communication based on a low-load CAN as necessary without adding a redundant system for the CAN.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system comprising:
    a first communication bus available for communication of at least a first communication scheme;
    a second communication bus available for both communication of the first communication scheme and communication of a second communication scheme having a lower processing load than the first communication scheme;
    a plurality of first communication devices connected to both the first communication bus and the second communication bus;
    a plurality of second communication devices, connected to the second communication bus and not connected to the first communication bus, which perform communication through the second communication scheme using the second communication bus; and
    a processor that detects an abnormality of the first communication bus,
    wherein each of the plurality of first communication devices
    performs communication through the first communication scheme using the first communication bus in a case where the abnormality of the first communication bus is not detected by the processor, and
    in a state where the plurality of second communication devices is performing communication through the second communication scheme using the second communication bus and in a case where the abnormality of the first communication bus is detected by the processor, performs communication through the first communication scheme using the second communication bus instead of using the first communication bus after the plurality of second communication devices stop communication through the second communication scheme using the second communication bus.

2. The communication system according to claim 1 which is mounted in a vehicle,
    wherein at least one of the plurality of first communication devices performs processing relating to traveling control of the vehicle, and
    at least one of the plurality of second communication devices performs processing relating to control other than the traveling control of the vehicle.

3. The communication system according to claim 1,
    wherein, in a case where the abnormality of the first communication bus is detected by the processor, at least some of the plurality of first communication devices switch a state of the communication system so as to perform communication through the first communication scheme using the second communication bus.

4. The communication system according to claim 3, wherein each of the plurality of first communication devices includes the processor, and switches the state of the communication system so as to perform communication through the first communication scheme using the second communication bus.

5. The communication system according to claim 3, wherein at least some of the plurality of first communication devices are able to output a signal to the second communication bus, and output a predetermined signal to the second communication bus in a case where the abnormality of the first communication bus is detected by the processor, and
    each of the plurality of first communication devices is switched to a state in which communication is performed through the first communication scheme using the second communication bus in a case where the predetermined signal is received using the second communication bus.

6. The communication system according to claim 5, wherein the predetermined signal is a signal based on the second communication scheme, and
    each of the plurality of second communication devices stops communication using the second communication bus in a case where the predetermined signal that flows through the second communication bus is received.

7. The communication system according to claim 5, wherein the predetermined signal is a signal based on the first communication scheme, and
    each of the plurality of second communication devices stops communication using the second communication bus when the signal based on the first communication scheme that flows through the second communication bus is detected.

8. The communication system according to claim 1, wherein
    in a state where the plurality of second communication devices is performing communication through the second communication scheme using the second communication bus and where each of the plurality of first communication devices is connected to both the first communication bus and the second communication bus, and in a case where the abnormality of the first communication bus is detected by the processor:
    the each of the plurality of first communication devices performs communication through the first communication scheme using the second communication bus instead of using the first communication bus after the plurality of second communication devices stop communication through the second communication scheme using the second communication bus.

9. A communication system comprising:
    a first communication bus available for communication of at least a first communication scheme;
    a second communication bus available for both communication of the first communication scheme and communication of a second communication scheme having a lower processing load than the first communication scheme;
    a plurality of first communication devices connected to both the first communication bus and the second communication bus;
    a plurality of second communication devices, connected to the second communication bus, which perform communication through the second communication scheme using the second communication bus; and
    a processor that detects an abnormality of the first communication bus,
    wherein each of the plurality of first communication devices
    performs communication through the first communication scheme using the first communication bus in a case where the abnormality of the first communication bus is not detected by the processor, and
    performs communication through the first communication scheme using the second communication bus in a case where the abnormality of the first communication bus is detected by the processor,
    wherein, in a case where the abnormality of the first communication bus is detected by the processor, at least some of the plurality of first communication devices switch a state of the communication system so as to perform communication through the first communication scheme using the second communication bus, wherein at least some of the plurality of first communication devices are able to output a signal to the second communication bus, and output a predetermined signal to the second communication bus in a case where the abnormality of the first communication bus is detected by the processor, each of the plurality of first communication devices is switched to a state in which communication is performed through the first communication scheme using the second communication bus in a case where the predetermined signal is received using the second communication bus, and wherein at least some of the plurality of first communication devices include the processor, and switch the state of the communication system so as to perform communication through the first communication scheme using the second communication bus, each of the plurality of first communication devices adds one piece of identification information corresponding to itself in a first identification information group to a transmission signal and performs communication using the first communication bus in a case where the abnormality of the first communication bus is not detected by the processor, each of the plurality of second communication devices adds one piece of identification information corresponding to itself in a second identification information group to a transmission signal and performs communication using the second communication bus, and one piece of identification information in the first identification information group is included in the predetermined signal.

10. A communication system comprising:
a first communication bus available for communication of at least a first communication scheme;
a second communication bus available for both communication of the first communication scheme and communication of a second communication scheme having a lower processing load than the first communication scheme;
a plurality of first communication devices connected to both the first communication bus and the second communication bus;
a plurality of second communication devices, connected to the second communication bus, which perform communication through the second communication scheme using the second communication bus; and
a processor that detects an abnormality of the first communication bus,
wherein each of the plurality of first communication devices
performs communication through the first communication scheme using the first communication bus in a case where the abnormality of the first communication bus is not detected by the processor, and
performs communication through the first communication scheme using the second communication bus in a case where the abnormality of the first communication bus is detected by the processor,
wherein the communication system is mounted in an electromotive vehicle in which a secondary battery for traveling that is charged from an outside is mounted, the communication system further comprising a charge control device that transmits and receives information for performing charge control of the secondary battery, and
wherein, in a case where the charge control of the secondary battery is performed, the charge control device performs communication through the second communication scheme using both the first communication bus and the second communication bus in a state in which one of the first communication bus and the second communication bus is set as an active system and the other is set as a redundant system.

* * * * *